United States Patent [19]
Gerritsen et al.

[11] 3,898,520
[45] Aug. 5, 1975

[54] DEFLECTION COILS AND SYSTEM HAVING TWO QUADRIPOLAR FIELDS AT A FORTY FIVE DEGREE ANGLE WITH RESPECT TO EACH OTHER

[75] Inventors: Jan Gerritsen; Adrianus Hubertus Kantelberg; Gerrit Kool, all of Emmasingel, Eindhoven, Netherlands

[73] Assignee: U.S. Philips Corporation, New York, N.Y.

[22] Filed: Aug. 23, 1973

[21] Appl. No.: 390,701

[30] Foreign Application Priority Data

Sept. 6, 1972 Netherlands ........ 7212106
July 2, 1973 Netherlands ........ 7309173

[52] U.S. Cl. ........ 315/370; 315/13 C
[51] Int. Cl. ........ H01j 29/56
[58] Field of Search ........ 315/27 GD, 27 XY, 13 C, 315/370

[56] References Cited

UNITED STATES PATENTS

| | | | |
|---|---|---|---|
| 3,631,296 | 12/1971 | Collie, Jr. | 315/27 GD |
| 3,714,500 | 1/1973 | Kaashoek | 315/27 GD |
| 3,761,763 | 9/1973 | Sarvta | 315/13 C |
| 3,793,554 | 2/1974 | Rossaert | 315/27 XY |
| 3,803,444 | 4/1974 | Gerritsen et al. | 315/13 C |

*Primary Examiner*—Maynard R. Wilbur
*Assistant Examiner*—G. E. Montone
*Attorney, Agent, or Firm*—Frank R. Trifari; Henry I. Steckler

[57] ABSTRACT

A deflection coil system in which two quadripolar field systems are produced in the deflection plane, namely one with its polar axes in the deflection directions and one with its polar axes along the diagonals so that the convergence, especially when using picture tubes having three beams in one plane, can be corrected. The deflection coils are wound toroidally and the first quadripolar field system is generated due to taps thereof. They may also be each split up into four parts while four impedances are interpositioned in such a manner that adjusting members having an electrical centre and means of high impedance are not necessary.

20 Claims, 11 Drawing Figures

DEFLECTION COILS AND SYSTEM HAVING TWO QUADRIPOLAR FIELDS AT A FORTY FIVE DEGREE ANGLE WITH RESPECT TO EACH OTHER

The invention relates to colour television display apparatus provided with a cathode-ray tube having a display screen and a system of deflection coils comprising a magnetic core on which a first and a second deflection coil unit are provided, each unit comprising two preferably symmetrical coil halves, said system of deflection coils being slid on the neck of the cathode-ray tube for deflecting at least one electron beam generated in the cathode-ray tube into two substantially orthogonal directions because a deflection current originating from the deflection generator flows through each coil half, a quadripolar field system being generated approximately at the area of the deflection plane of the electron beam by a correction current flow in the coil halves of the first deflection coil unit and by a second correction current induced in the coil halves of the second deflection coil unit, the deflection coil halves being toroidally wound on the core.

In the arrangement according to U.S. Pat. No. 3,793,554 for correcting deflection errors a quadripolar field system is generated having two components of the same frequency whose polar axes substantially coincide. These axes either coincide with the deflection directions or with the diagonals thereof. A combination is not possible. The arrangement according to the present patent application is characterized in that a second quadripolar field system is generated approximately at the area of the deflection plane of the electron beam because at least one third correction current flows in the coil halves of a deflection coil unit, the substantially coinciding polar axes of the second quadripolar field system being shifted approximately 45° relative to the substantially coinciding polar axes of the first quadripolar field system.

The invention is based on the recognition of the fact that under circumstances, for example, when using a colour television display tube in which three electron beams are generated in one flat plane it may be desirable to have such a field distribution and that this is possible with simple means. In one embodiment the arrangement according to the invention is characterized in that the third correction current flows through a tap of each coil half of a deflection coil unit. In another embodiment it is characterized in that each coil half is split up into two susbtantially equal coil parts in which one end of one coil part is connected through an impedance to one end of the other coil part of the same coil half and through a further impedance to one end of one coil part of the other coil half, both coil halves being connected in a parallel arrangement to the deflection current generator.

The invention will be described in detail by way of example with reference to the accompanying Figures.

FIGS. 1*a* and 1*b* show the desired field distributions

FIG. 1 is a simple elevational view of the cross-section of a colour television display tube 1 at the area of the deflection plane at right angles to the axis of the tube in a direction opposite to the propagation direction of the electron beams, the deflection coils not being shown for the sake of simplicity. The electron beams $B_R$, $B_G$ and $B_B$ for the colours red, green and blue, respectively, are generated in this embodiment in one horizontal plane, while beam $B_G$ substantially coincides with the axis of the tube 1. As is known it is possible to design the deflection coils in such a manner that a dynamic convergence correction is not necessary i.e., the beams coincide at all points of the display screen of tube 1. Since in practice the beams will never exactly be generated in accordance with the theory, convergence errors will occur. The invention is based on the recognition of the fact that such errors can be corrected by means of the deflection coils.

Figure 1A:
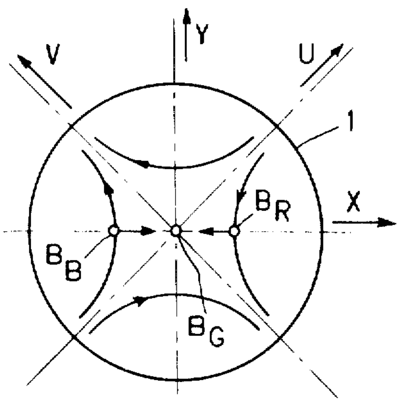

If a quadripolar field according to FIG. 1*a* is a generated i.e., a field whose polar axes coincide approximately with the diagonals U and V of the X-Y system of axes, the X-axis coinciding with the horizontal deflection direction and the Y-axis coinciding with the vertical deflection direction, beams $B_B$ and $B_R$ are subject to forces directed along the X-axis. These forces are superimposed on the forces exerted by the deflection fields. In the Figures these forces bring the said beam towards one another. The reverse is effected when the quadripolar field of which only four lines of forces are shown reverses its polarity.

Figure 1B:
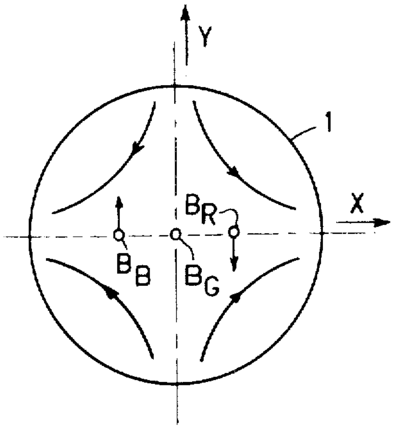

The quadripolar field does not exert influence on the beam $B_G$ which is present in the middle of the deflection plane. The same is the case for the quadripolar field according to FIG. 1*b*. Its polar axes coincide approximately with the X and the Y-axes and the Figure shows that beams $B_B$ and $B_R$ undergo vertical and opposite forces which in a corresponding manner may be reversed in polarity relative to that which is shown in the Figure. When two quadripolar fields one according to FIG. 1*a*, and one according to FIG. 1*b* are simultaneously present the convergence errors caused by tolerances could be corrected, provided that the variation of the fields as a function of time was suitable. An error theoretically remains, namely the error which can be corrected by vertical and/or horizontal shifts in the same direction of beams $B_B$ and $B_R$, but it has been found that such an error does not often occur. It would have to be corrected in another manner not described in the present patent application.

Figure 2:
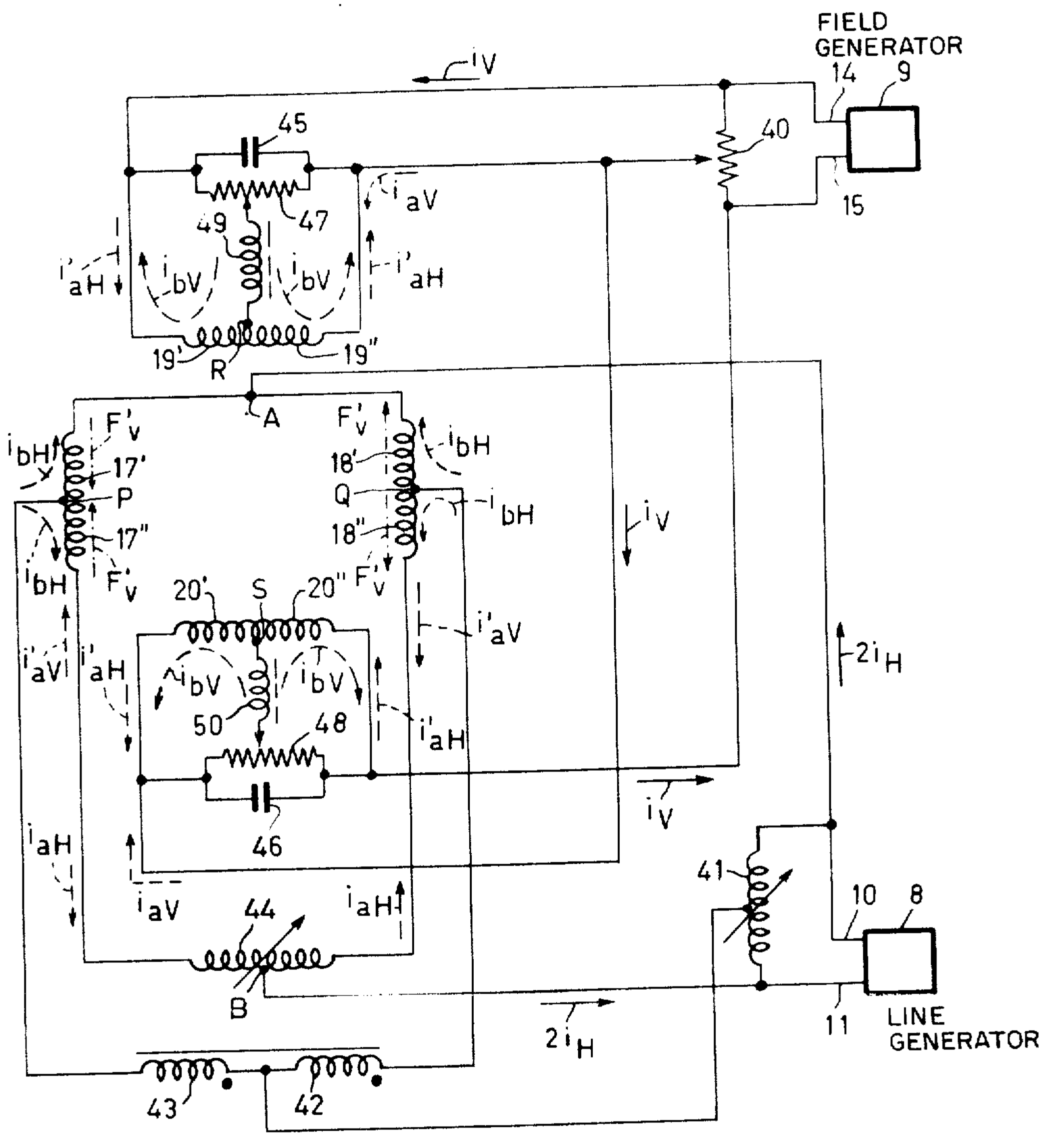
FIG. 2 shows a first embodiment of the invention.

In the arrangement according to the said U.S. patent either a quadripolar field system according to FIG. 1*a* or a quadripolar field system according to FIG. 1*b* is generated with the aid of the deflection coils. FIG. 2 of the present patent application diagrammatically shows an arrangement in which the two quadripolar field systems can be generated simultaneously so that the convergence errors can be corrected with the aid of the deflection coils. In this case it has been assumed that the errors to be corrected are small. Since they are caused by asymmetry errors it is therefore sufficient in the first instance to have linearly varying fields. Since the two deflection currents also vary linearly, the arrangement may be very simple. The coil halves 17 and 18 of the deflection unit for the horizontal deflection are provided on the core of the deflection coil system. A line deflection current $i_H$ originating from the line deflection generator 8 flows through the windings 17 and 18 and in this case these windings are connected in parallel for this current. The coil halves 19 and 20 of the deflection unit for the vertical deflection are likewise provided on the core. A field deflection current $i_V$ originating from the field deflection generator 9 flows through these windings 19 and 20 and in this example they are arranged in series.

The ends of a potentiometer 40 are connected to the output terminals 14 and 15 of field deflection generator 9, while the ends of an inductor 41 are connected to the output terminals 10 and 11 of line deflection generator 8. Coil halves 17, 18, 19 and 20 are wound toroidally on the core and are each split up into two substantially equal coil parts, namely 17', 17'', 18', 18'', 19', 19'', and 20', 20''. Part 17' is provided on the core (not shown) at the top left, part 17'' at the bottom left, part 18' at the top right hand part 18'' at the bottom right. In a corresponding manner part 19' is provided on the core at the top left, part 19'' at the top right, part 20' at the bottom left and part 20'' at the bottom right.

The connection point between the coil parts 19'' and 20' is connected to the wiper on the potentiometer 40. Two bifilarly wound coils 42 and 43, thus tightly coupled together, are arranged between the central taps P and Q of coil halves 17, 17'', and 18', 18'' and the connection point of these coils is connected to the central tap of inductor 41. Inductor 41 is wound on a movable core so that the two halves thereof can be unbalanced. The other ends of coil parts 17' and 18' are connected to output terminal 10 (point A in FIG. 2) while the ends of coil parts 17'' and 18'' remote from point P and Q are connected through an inductor 44 which has a central tap B. This tap is connected to the output terminal 11 and the halves of inductor 44 may be unbalanced in the same manner as those of inductor 41.

The parallel network of a capacitor 45 and a potentiometer 47 is connected in parallel with coil halves 19', 19'' and the parallel network of a capacitor 46 and a potentiometer 48 is connected in parallel with coil halves 20', 20''. The central taps R and S of coil halves 19', 19'' and 20', 20'' are connected through chokes 49 and 50, respectively, to the wiper on the respective potentiometers.

When the said adjusting members, i.e., inductors 41 and 44 and potentiometers 40, 47 and 48 are in balance, only the deflection currents $i_V$ and $i_H$ flow through the deflection coil parts. In fact, there is no field frequency potential difference between point R and the electrical central point of potentiometer 47. Analogously there is no line frequency potential difference between point P and the electrical central point of inductor 41. When one or more of the said members is unbalanced, correction current flow. When the wiper on potentiometer 40 is adjusted at a position deviating from the electrical central point thereof, a field frequency correction current $i_{aV}$ flows through coil parts 19' and 19'', for example, in the direction opposite to that of deflection current $i_V$ while a current of the same intensity flows in the same direction as current $i_V$ through coil parts 20' and 20''. As a result a field frequency quadripolar field according to FIG. 1A is generated by these coil parts. A current $i'_{aV}$ is induced in coil halves 17', 17'' and 18', 18'' so that a quadripolar field having the same frequency and substantially the same shape is generated, while the voltage produced by current $i'_{aV}$ between points A and B is zero because the voltages across coil halves 17', 17'' and 18', 18'' eliminate each other due to the parallel arrangement thereof. Since the output voltage of generator 9 is sawtooth-shaped and since coil halves 17', 17'' and 18'' have a predominantly resistive behaviour for the field frequency, the two correction currents are sawtooth-shaped.

A correction current $i_{aH}$ is generated with the aid of inductor 44 through coil halves 17', 17'', 18', 18'', which correction current as shown in FIG. 2 is opposite in coil halves 18', 18'', for example, to deflection current $i_H$, whereas it flows in the same direction in coil halves 17', 17''. As a result a line frequency quadripolar field according to FIG. 1*a* is generated. A current $i'_{aH}$ is induced in coil halves 19', 19'' and 20', 20'' which current generates a quadripolar field having the same frequency and substantially the same shape. In order that the voltage caused by this current between output terminals 14 and 15 is zero, capacitors 45 and 46 are provided which provide a path having a very low impedance. If the output voltage of generator 8 between terminals 10 and 11 is pulsatory, the currents $i_H$, $i_{aH}$ and $i'_{aH}$ are sawtooth-shaped because the path for these currents is predominantly inductive for the line frequency.

Quadripolar fields according to FIG. 1b are realised with the aid of taps P, Q, R and S. By adjusting inductor 41 a line frequency sawtooth current $i_{bH}$ is obtained which flows through winding 42 and coil part 18' and returns through point A to inductor 41. Similarly a current flows through winding 43 and coil part 17', one flows through winding 42 and coil part 18'' and one flows through winding 43 and coil part 17'', the two latter currents returning through point B. It will be noted that inductor 44 causes a small asymmetry but an adjustment of inductor 41 can be found with which this asymmetry disappears. The inductance of inductor 44 is in fact low relative to that of the deflection coil halves. All four currents described are therefore substantially equal. Thus a line frequency quadripolar field according to FIG. 1*b* is produced. It is true that the flux caused thereby in the core induces voltages in coil parts 19', 19'' and 20', 20'', but these voltage are directed against each other. The total resultant voltage across coil halves 19', 19'' and 20', 20'' is therefore zero. The resultant voltage between points R and S is also zero so that no current flows.

Analogously four field frequency sawtooth currents are applied to taps R and S by adjusting potentiometers 47 and 48, which currents can be rendered equal. In FIG. 2 they are denoted by $i_{bV}$ and a field frequency quadripolar field according to FIG. 1*b* is generated. In a manner analogously as described above current $i_{bV}$ does not induce a voltage and neither a current in coil halves 17', 17'' and 18', 18''. There is extra degree of freedom with the aid ofpotentiometers 47 and 48, namely a separate adjustment for the upper and lower part of the image. They may also be coupled mechanically if this degree of freedom is not necessary. It may be noted that all said correction currents can reverse their polarity with the aid of the adjusting members.

A voltage is induced by the line deflection current between the taps R and S of the field deflection coils halves. Likewise the field deflection current and predominantly the current flowing during the field flyback period induces a voltage between the taps P and Q of the line deflection coil halves.

When it is assumed that the lines of force of the vertical deflection field vary from the right to the left in the core at the area of coil parts 19' and 19'' and coil parts 20' and 20'' so that they vary in the space within the core from the left to the right, it appears that a deflection field of field frequency is induced in the coil unit for the horizontal deflection whose lines of force at the area of parts 17' and 18'' vary from the top to the bottom and at the area of parts 17'' and 18' vary from the bottom to the top. These lines of force $F'_V$ are denoted by chain-link arrows. Thus a deflection potential difference of field frequency is produced between points P and Q. In order that it cannot produce any current the coils 42 and 43 are provided.

Due to the winding sense of coils 42 and 43 they do not provide any noticeable impedance for correction current $i_{bH}$, but they constitute a high impedance for possible currents between taps P and Q. This is necessary so as not to short-circuit the induced field flyback pulse and it prevents also equalising currents between the two taps in case of symmetry errors in the line deflection coils. Analogously chokes 49 and 50 serve to prevent short circuit of the line deflection voltage induced between taps R and S and therefore for the output voltage of line deflection generator 8.

In the embodiment of FIG. 2 taps P, Q, R and S are provided in the middle of each coil half. It is evident that they can be provided elsewhere than in the middle, provided that the relevant adjusting members are adjusted in such a manner that the different quadripolar fields remain symmetrical as is shown in FIGS. 1*a* and 1*b*.

Figure 3:
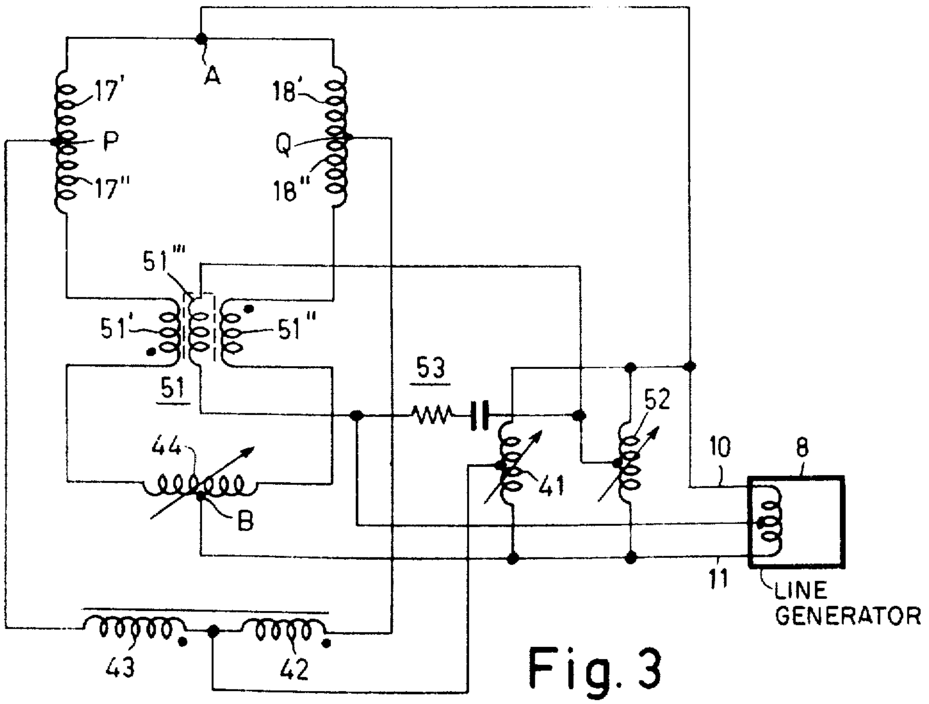
FIG. 3 shows a second embodiment with a parabolic correction current.

It has been assumed in the foregoing that the convergence errors can be corrected with the aid of linearly varying quadripolar fields. It may occur that more complicated corrections are required so that the adjusting members 40, 41, 44, 47 and 48 shown in FIG. 2 must be replaced by generators which generate the suitable correction currents. Also a static adjustment, i.e., by means of direct currents may be used. If a parabolic correction current of line frequency generating a quadripolar field according to FIG. 1*a* is to be superimposed on the above-described sawtooth current through the line deflection coil parts, the arrangement according to FIG. 3 may be used in which Figure only the important elements are shown. A transformer 51 having three windings is included in the arrangement of which two windings 50' and 51'' are arranged in series with coil halves 17', 17'' and 18', 18'', respectively. An adjustable inductor 52 is connected in parallel with inductor 41. The voltage at the central tap thereof is integrated by means of an RC-series network 53 and is applied to the third winding 51'' of transformer 51 so that a parabolic current is superimposed on current $i_{aH}$. The winding senses of winding 51' and 51'' must be such that this current in coil halves 17', 17'' flows, for example, from A to B and in coil halves 18', 18'' flows from B to A. The current may be reversed in polarity with the aid of inductor 52. FIG. 3 shows that current $i_H$ does not cause a flux in the core of transformer 51.

Figure 4:
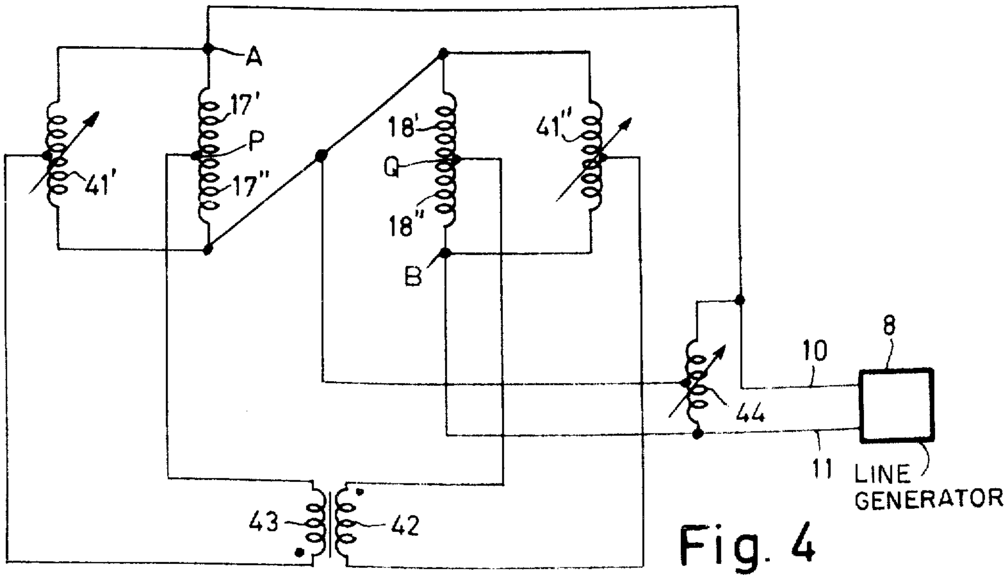
FIG. 4 shows a third embodiment with series coupled line deflection coils.

The principle of the invention may alternatively be used when the line deflection coil halves are arranged in series. FIG. 4 shows the relevant part of the arrangement according to the invention in such a case in which corresponding elements have the same reference numerals as those in FIG. 2. Likewise as coil halves 19', 19'' and 20', 20'' in FIG. 2, coil halves 17', 17'' and 18', 18'' shown in FIG. 4 are shunted by two adjusting members namely inductors 41' and 41'' which can be adjusted simultaneously by means of, for example, a mechanical coupling and which have a low impedance for the field frequency.

Figure 5:
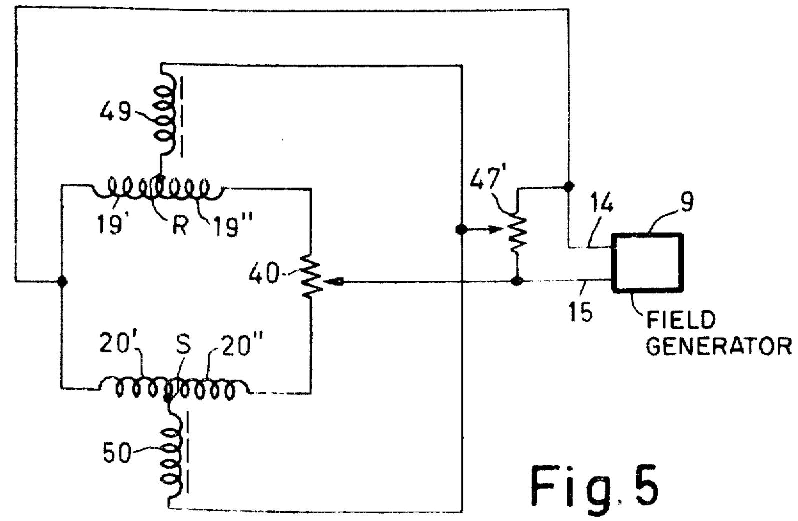
FIG. 5 shows a fourth embodiment with parallel coupled field deflection coils.

FIG. 5 shows the field deflection circuit for the case where the field deflection coil halves are connected in parallel. Potentiometer 40 is included in FIG. 5 between coil parts 19'' and 20'' likewise as inductor 44 between coil parts 17'' and 18'' in FIG. 2 while a potentiometer 47' is arranged between output terminals 14 and 15, the wiper being connected to taps R and S in the same manner as inductor 41 in FIG. 2 relative to output terminals 10 and 11 and taps P and Q.

The described embodiments require adjusting members which are either inductive or resistive and have an electrical centre. They also induce means, for example, chokes of a high impedance ensuring that the deflection field induced by one deflection coil unit in the other deflection coil unit cannot produce any current there.

Figure 6:
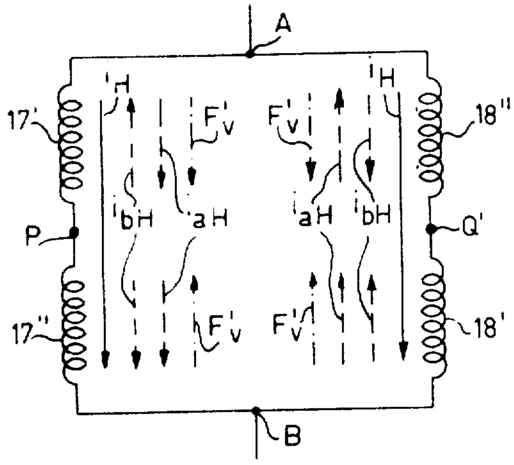
FIG. 6 shows a fifth embodiment with deflection coils that do not require a center tap.

FIG. 6 shows the simplified diagram of an arrangement of coil parts 17', 17'', 18' and 18'' in which the sources for current $i_{aH}$ and $i_{bH}$ do not require any electrical centre and in which no path of high impedance for field frequency deflection currents is necessary. FIG. 6 shows relative to FIG. 2 parts 18' and 18'' exchanged in place while their connection point is referred to as Q'. FIG. 6 shows that a path must be provided for current $i_{bH}$ between points P and Q' in which path the source of this current will be present so that this source does not need an electrical centre. It is also apparent that lines of force $F'_V$ are directed to the points P and Q' so that no induced field frequency deflection potential difference is produced between these points. Consequently a current which might be caused thereby does not flow between these points while no circulating field frequency deflection current flows through the coil parts. Due to the parallel arrangement the field frequency correction currents induced in coils parts 17', 17'', 18' and 18'' do not produce a voltage between points A and B. As in FIG. 2 correction current $i_{aV}$ induces a current $i'_{aV}$ through coil parts 17', 17'', 18' and 18'' in FIG. 6 but the voltage caused thereby is zero between points A and B while correction current $i_{bV}$ does not induce current in the said coil parts.

Figure 7:
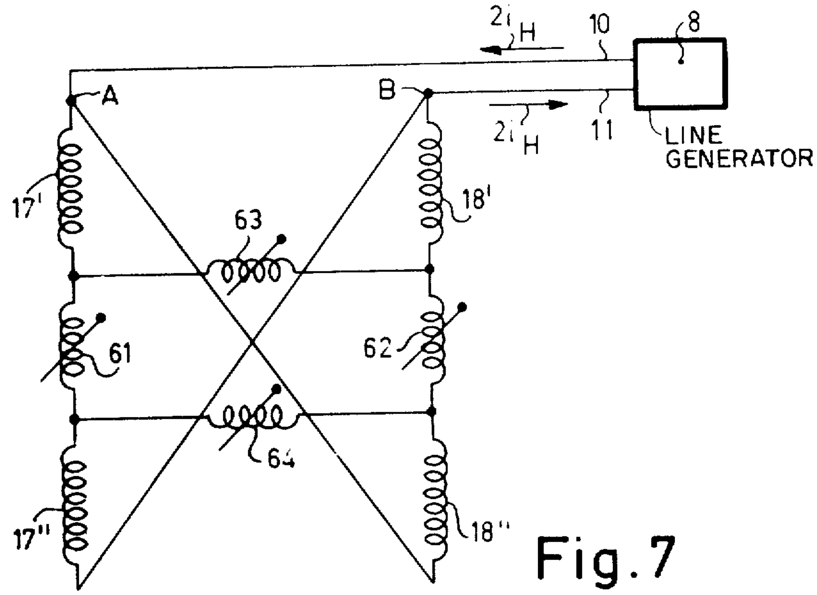
FIG. 7 shows more details of the circuit of FIG. 6.

A practical embodiment of FIG. 6 is shown in FIG. 7 in which coil parts 17', 17'', 18', 18'' are arranged as in FIG. 2 and are connected together as in FIG. 6. Adjustable coils 61 and 62 are incorporated between the parts 17' and 17'' and 18' and 18'', respectively. When the inductances of coils 61 and 62 are equal, the deflection currents through the coil parts are equal. When the inductance of a coil, for example, 61 is lower than that of the other coil, for example, 62, the deflection current through parts 17' and 17'' is larger than that through parts 18' and 18'' which may be considered as if an extra sawtooth current is added to deflection current $i_H$ through parts 17' and 17'' while an extra sawtooth current is subtracted from deflection current $i_H$ through parts 18' and 18''. Coils 61 and 62 can be adjusted in such a manner that the above-mentioned sawtooth currents are equal in absolute value: in this manner correction current $i_{aH}$ is generated. In order that it does not exert any influence on line deflection generator 8 the total impedance of the network constituted by the elements 17', 61, 17'', 18', 62 and 18'' between output terminals 10 and 11 must remain constant, which means that the sum of the inductances 61 and 62 must remain substantially constant. Otherwise their adjustments would have influence on the line deflection, for example, on the horizontal amplitude. This can be realized by coupling both adjustments mechanically together, for example, by providing both coils on one and the same displaceable core.

An adjustable coil 63 is provided between the connection point of coil part 17' and coil 61 and that of coil part 18' and coil 62 and an adjustable coil 64 is incorporated between the connection point of coil part 17'' and coil 61 and that of coil part 18'' and coil 62. When the deflection current in FIG. 7 flows through coil 61 from the top to the bottom and through coil 62 from the bottom to the top, a positive potential difference from the right to the left is produced across coil 63 and from the left to the right across coil 64. Consequently, sawtooth currents flow through these coils, which currents are different on the condition that the inductances of coils 63 and 64 are different while the adjustment of coils 61 and 62 substantially does not have any influence on these currents. When the inductance of for example coil 63 is lower than that of coil 64, more current flows through coil 63 than through coil 64 which may be considered as if one current circulates through coils 61, 64, 62 and 63 while a current through coil 63 is added thereto and a current through coil 64 is subtracted therefrom. These currents may be made equal in absolute value: in this manner correction current $i_{bH}$ is generated. Also the sum of the inductances of coils 63 and 64 must remain substantially constant and their adjustments may likewise be coupled.

Modifications of the circuit arrangement according to FIG. 6 are feasible in which two coil parts are interchanged, but it may be proved that only the described embodiment results in the said simplification relative to that of FIG. 2.

Figure 8:
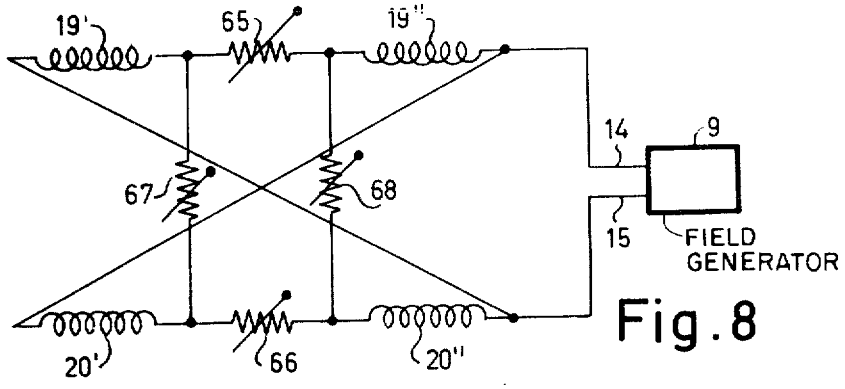
FIG. 8 shows a sixth embodiment which uses fixed coils and adjustable resistors.

It will be evident that the principle of FIG. 6 may alternatively be used for the deflection unit for the vertical deflection. FIG. 8 shows such an embodiment in which no adjustable coils but adjustable resistors 65, 66, 67 and 68 serve as sources for the correction currents. By adjusting resistors 65 and 66 incorporated between coil parts 19' and 19'' and 20' and 20'', respectively, correction current $i_{aV}$ is adjusted while the adjustment of resistors 67 and 68 is used for adjusting correction current $i_{bV}$. These adjustments may be mechanically coupled in order that the sum of the resistances of resistors 65 and 66 and 67 and 68 remains substantially constant. Also in this case other feasible arrangements of the coil parts do not lead to the desirable simplification.

Figure 9:
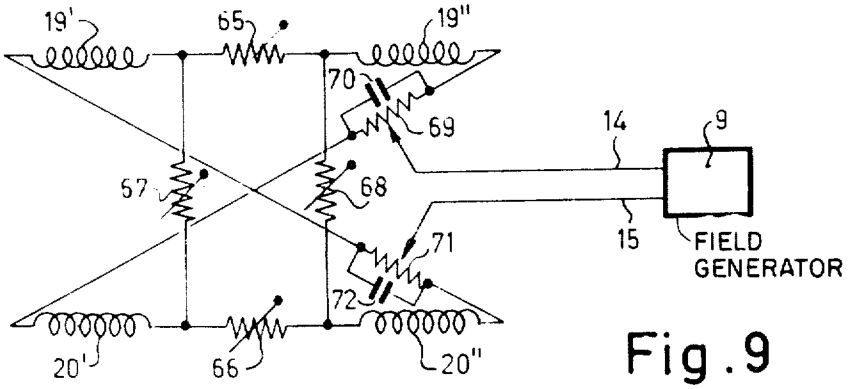
FIG. 9 shows a seventh embodiment which integrates the deflection current.

As described above a parabola correction current may be desirable. Such a current may alternatively be generated in the embodiments of FIGS. 7 and 8. FIG. 9 shows as an example an embodiment derived from FIG. 8 in which the parallel arrangement of potentiometers 69 and 71 and capacitors 70 and 72 is incorporated between coil parts 19'' and 20' and 19' and 20'', respectively. As a result an integration of the deflection current is effected.

Figure 10:
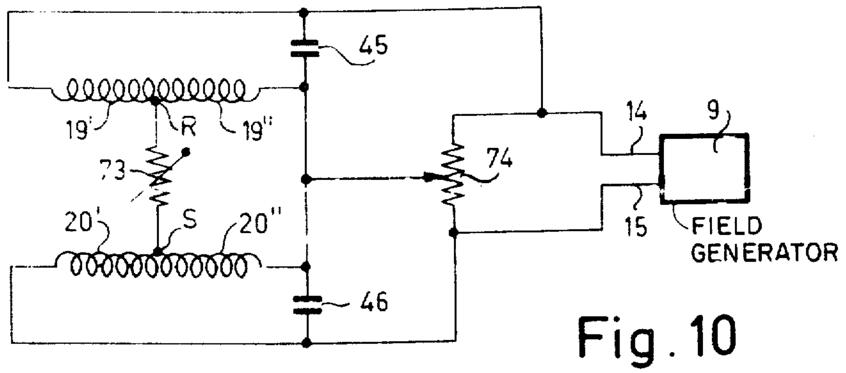
FIG. 10 shows an eighth embodiment which has series coupled vertical deflection coils.

FIG. 10 shows a modification in which the coil parts of a deflection unit, for example, that which ensures the vertical deflection are arranged in series. An adjustable resistor 73 is included between points R and S while a potentiometer 74 is arranged between the output terminals 14 and 15 of the field deflection generator 9 while the wiper is connected to the connection point of coil parts 19'' and 20''. It will be evident that the adjustment of this wiper is the adjustment of correction current $i_{aV}$, while resistor 73 ensures the adjustment of correction current $i_{bV}$. Coil halves 19', 19'' and 20', 20'' are short-circuited for line-frequency voltages by means of capacitors 45 and 46, respectively. Since the voltage induced by the horizontal deflection field in the coil parts 19' and 20' are equal, there is no line-frequency deflection potential difference between points R and S. This arrangement has, however, the drawback that resistor 73 can be adjusted in one direction only so that in the case of the other polarity being necessary coil halves 19' and 19'', 20' and 20'' are to be exchanged which is not very practical. One possibility to obviate this is to design the deflection unit in such a manner that the error then deliberately introduced can be corrected with one polarity.

Although in the foregoing the error to be corrected occurs when using a display tube in which the electron beams are generated in one flat plane, the principle of the invention need not be limited to such a tube. In a tube in which three electron guns are placed at the corners of an equilateral triangle it is known that astigmatic deflection errors may occur. The arrangement according to the invention can correct such errors, while the correction currents must have the variation as a function of the time suitable for the relevant correction.

As is known a quadripolar field which is active approximately at the area of the deflection plane can be generated by means of an arbitrary deflection coil unit. This means that a line-frequency correction quadripolar field can be generated by means of the unit for the horizontal deflection or by means of the unit for the vertical deflection, or by both. Likewise a field-frequency correction quadripolar field can be generated by means of the unit for the vertical deflection or by means of the unit for the horizontal deflection, or by both. It will be evident that this also applies in this case.

What is claimed is:

1. Colour television display apparatus provided with a cathode-ray tube having a display screen and a system of deflection coils comprising a magnetic core on which a first and a second deflection coil unit are provided, each unit comprising two coil halves, said deflection coil system being slid on the neck of the cathode-ray tube for deflecting at least one electron beam generated in the cathode-ray tube into two substantially orthogonal directions, means for applying a deflection current originating from the deflection current generator through each coil half, means for generating approximately at the area of the deflection plane of the electron beam of a quadripolar field system including means for applying a first correction current to the coil halves of the first deflection coil unit and a second correction current induced in the coil halves of the second deflection coil unit, the deflection coil halves being toroidally wound on the core, and means for generating a second quadripolar field system approximately at the area of the deflection plane of the electron beam including means for applying at least a third correction current to the coil halves of one of said deflection coil units, the substantially coinciding polar axes of the second quadripolar field system being shifted approximately 45° relative to the substantially coinciding polar axes of the first quadripolar field system.

2. Apparatus as claimed in claim 1, wherein the polar axes of the second quadripolar field system approximately coincide with the deflection directions that the polar axes of the first quadripolar field system are shifted approximately 45°, relative to the deflection directions.

3. Apparatus as claimed in claim 2, wherein the third correction current flows through a tap of each coil half of said one deflection coil unit.

4. Apparatus as claimed in claim 1, wherein each coil half comprises two substantially equal coil parts in which one end of one coil part is coupled through an impedance to one end of the other coil part of the same coil half and through a further impedance to one end of one coil part of the other coil half, both coil halves being coupled in a parallel arrangement to the deflection current generator.

5. Apparatus as claimed in claim 4, in which a first coil part is provided on the core at the top left, a second coil part at the bottom left, a third coil part at the top right and a fourth coil part at the bottom right, and further comprising a first impedance coupled between the first and the second coil part, a second impedance coupled between the third and the fourth coil part, a third impedance coupled between the connection point of the first coil part and the first impedance and that of the third coil part and the second impedance, and a fourth impedance coupled between the connection point of the second coil part and the first impedance and that of the fourth coil part and the second impedance, the ends of the first and the fourth coil part remote from the said impedances being coupled together and to a terminal of the deflection current generator and the ends of the second and the third coil part remote from the said impedances being coupled together and the the other terminal of the deflection current generator.

6. Apparatus as claimed in claim 5, wherein the impedances are adjustable while the sum of the impedance values of the first and the second impedance is substantially constant and the sum of the impedance values of the third and the fourth impedance is substantially constant.

7. Apparatus as claimed in claim 6, wherein the adjusting members of the first and second impedances are mechanically coupled and that the adjusting members of the third and fourth impedances are mechanically coupled.

8. Apparatus as claimed in claim 3, wherein the coil halves are arranged in series for the deflection current, and further comprising fifth and sixth impedances, the third correction current flows through a tap of said fifth impedance connected in parallel with the coil half, and through said sixth impedance.

9. Apparatus as claimed in claim 3 wherein the coil halves are arranged in parallel for the deflection current, and further comprising seventh and eighth impedances, the third correction current flows through a tap of said seventh impedance arranged between output terminals of the deflection current generator, and through said eighth impedance.

10. Apparatus as claimed in claim 4, wherein the deflection coil unit is used for the horizontal deflection, and the said impedances are inductors.

11. Apparatus as claimed in claim 4 wherein the deflection coil unit ensures the vertical deflection, and the said impedances are resistors.

12. Apparatus as claimed in claim 8 wherein the deflection coil unit is used for the vertical deflection, and the fifth impedance is a resistor and the sixth impedance is an inductor.

13. Apparatus as claimed in claim 1, wherein three electron beams are generated in the cathode-ray tube in one flat plane.

14. A system of deflection coils comprising a magnetic core on which a first and a second deflection coil unit are provided, each unit comprising two coil halves, means for applying a deflection current through each coil half, means for generating quadripolar field system including means for applying a first correction current to the coil halves of the first deflection coil unit and a second correction current induced in the coil halves of the second deflection coil unit, the deflection coil halves being toroidally wound on the core, and means for generating a second quadripolar field system including means for applying at least a third correction current to the coil halves of one of said deflection coil units, the substantially coinciding polar axes of the second quadripolar field system being shifted approximately 45° relative to the substantially coinciding polar axes of the first quadripolar field system.

15. A system of deflection coils as claimed in claim 14, a magnetic core on which two deflection coil units are provided, each unit comprising two coil halves, wherein each coil half is split up into two substantially equal coil parts while one end of one coil part is connected through an impedance to one end of the other coil part of the same coil half and through a further impedance to one end of one coil part of the other coil half.

16. An apparatus as claimed in claim 1 wherein each of said units comprises symmetrical coil halves.

17. An apparatus as claimed in claim 8, wherein the deflection coil unit comprises a horizontal deflection unit and said impedances comprise inductors.

18. An apparatus as claimed in claim 9 wherein the deflection coil unit comprises a horizontal deflection unit and the said impedances comprise inductors.

19. An apparatus as claimed in claim 9 wherein the deflection coil unit comprises a vertical deflection unit, the seventh impedances comprises a resistor, and the eighth impedance comprises an inductor.

20. A system of deflection coils as claimed in claim 14 wherein each said units comprises symmetrical coil halves.

* * * * *